May 3, 1960          T. ZETTL          2,935,085
VEHICLE CONTROL
Filed May 13, 1957
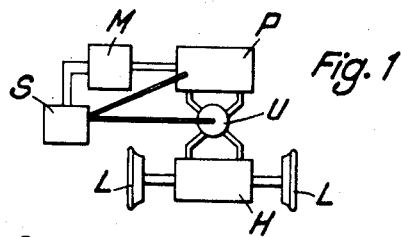
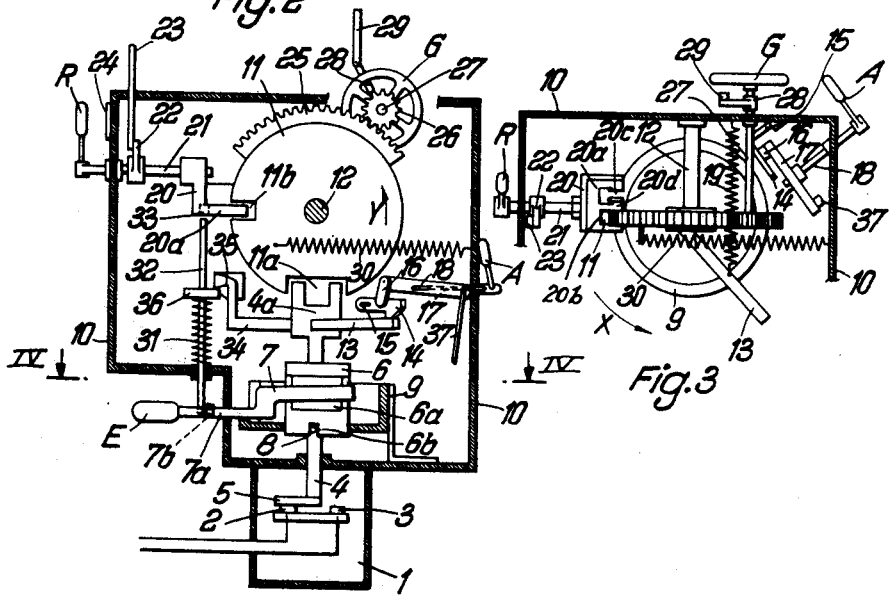
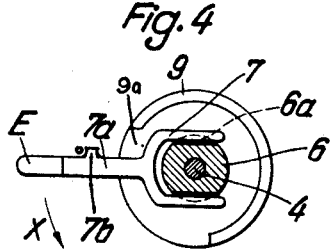
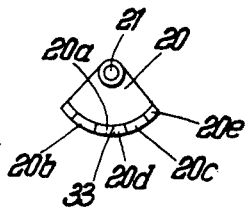
Inventor:
Toni Zettl
by:
Michael S. Striker
agt.

United States Patent Office 2,935,085
Patented May 3, 1960

2,935,085

VEHICLE CONTROL

Toni Zettl, Dortmund, Germany, assignor to Heinrich Bartz Kg., Dortmund-Korne, Germany Application May 13, 1957, Serial No. 658,885

Claims priority, application Germany May 12, 1956

18 Claims. (Cl. 137—565)

The present invention relates to vehicles.

More particularly, the present invention relates to vehicle controls. The present invention is suitable for use with a vehicle such as a locomotive for use in mines.

One of the objects of the present invention is to provide a vehicle with controls which are so inter-related that some controls cannot be actuated until other controls are in predetermined positions, so as to guard against unsafe operation of the vehicle.

Another object of the present invention is to provide an arrangement which will prevent adjustment of the operation of a pump of the vehicle until the switch of a pump driving motor is in its closed position.

A further object of the present invention is to provide an arrangement which prevents operation of a valve until an operating handle is connected to a switch and the switch is moved to its closed position.

It is also an object of the present invention to provide structure capable of accomplishing the above objects and composed of simple and ruggedly constructed elements which are very reliable in operation.

With the above objects in view the present invention consists of a vehicle which includes a driving motor and a pump driven by this motor. A hydraulic drive is driven by the pump and drives wheels of the vehicle. A manually operable adjusting means cooperates with the pump for controlling the rate of supply of liquid thereto so as to control the speed of the vehicle, and a switch cooperates with the driving motor for starting the same when the switch is in its closed position and for stopping the same when the switch is in its open position. A blocking means cooperates with the adjusting means and the switch for preventing operation of the adjusting means except when the switch in in its closed position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a schematic illustration of the arrangement of several units of the vehicle participating in the driving thereof;

Fig. 2 is a partly sectional elevational view of a control structure according to the present invention;

Fig. 3 is a top plan view of the structure of Fig. 2, the top wall of the housing of the control structure being eliminated in Fig. 3 to show clearly the structure therebeneath;

Fig. 4 is a sectional plan view taken along line IV—IV of Fig. 3 in the direction of the arrows and showing the manner in which an operating handle is removably connected to a switch means of the invention; and Fig. 5 is an elevational view of part of a valve setting means which participates in the mutual blocking and release of the several control elements.

Referring to Fig. 1, as is schematically illustrated therein the wheels L of a vehicle such as a mine locomotive are driven by a hydraulic drive H in the form of a hydraulic motor. The hydraulic drive H is supplied with liquid under pressure by a pump P which communicates with the hydraulic drive H through a multi-way valve U. The pump P is driven by an electric motor M. A control unit S controls the stop and start switch of the motor M, the position of the valve U, and the rate of delivery of liquid from the pump P to the hydraulic drive H for controlling the speed of the vehicle. These several controls provided through the unit S mutually block and unblock each other in a predetermined manner according to the present invention.

Figs. 2 and 3 show the details of the control unit S. This unit includes a lever E for starting the vehicle, a lever A for stopping the vehicle, a lever R for controlling the direction of movement of the vehicle (forwardly or rearwardly), and a hand wheel G for adjusting the speed of the vehicle. The lever E is removable as required by law in many countries where the operator must remove this lever (which often takes the form of a key, in order to prevent unauthorized operation of the vehicle.

The control unit S includes a support means formed in part by its outer housing 10. This outer housing 10 carries at its lower end a switch means 1 which is connected electrically with the motor M, the switch means having a closed position for starting the motor and an open position for stopping the motor. In the case of mine locomotives, the switch means 1 is fluid-tightly located within a housing protected against explosions. The switch means 1 includes, as is diagrammatically shown in Fig. 2, a support of electrically non-conductive material carrying a pair of stationary contacts 2 and 3 respectively connected with leads which are in turn connected to the motor M and a suitable source of current. A movable contact lever 5 carries a contact which bridges the contacts 2 and 3 for closing the switch means 1 and starting the motor when the lever 5 is in a predetermined angular position, the contact which is carried by the lever 5 and which is insulated therefrom being spaced from the contact 3 to place the switch means 1 in its open position for stopping the motor when the lever 5 is in a different angular position.

The lever 5 is fixed to the bottom end of a shaft 4 of the switch means 1, this shaft 4 extending vertically as viewed in Fig. 2 through the bottom wall of the housing 10 and being supported by suitable bearings carried by the housing 10 for turning movement while being prevented from shifting axially. A block 6 of the switch means is formed with a bore through which the shaft 4 freely passes, and this block 6 is formed at its exterior with a pair of opposed parallel elongated grooves 6a which respectively receive the bifurcations of a bifurcated end portion 7 of the lever E. At its bottom face block 6 is formed with a pair of dametrically opposed grooves 6b extending radially from the bottom end of the bore of block 6, and a pin 8 extends through the shaft 4 and has its portions which extend beyond the shaft 4 respectively located in the grooves 6b, so that in this way the block 6 is carried by the shaft 4 and transmits its turning movement to the shaft 4. A ring 9 concentrically surrounds the block 6 and is fixedly carried by the housing 10, and this ring 9 is formed at its left side, as viewed in Figs. 2 and 4, with a cutout 9a having a width slightly greater than the width of the bifurcated end portion 7 of the lever E, so that when this lever is in proper alignment with cutout 9a it may be removed through this cutout. At other angular positions of the block 6 and lever E, the ring 9 will prevent removal of the lever E. The lever E is shown in Figs. 2 and 4 in the position it takes when it can be moved through the cutout 9a. The lever E includes an elongated portion 7a fixed to and extending to the left from the bifurcated portion 7, as viewed in Figs. 2 and 4, and terminating in the outer portion of the lever E which is gripped by the operator. The lever E is turned in a clockwise direction indicated by the arrow X in Fig. 4 in order to move the switch means 1 from its open to its closed position, and the lever E is turned together with elements 4—6 through approximately 90° when the switch is moved between its open and closed positions.

The free end of the shaft 4 distant from the lever 5 terminates in a bifurcated portion 4a, and the space between the bifurcations of portion 4a is slightly greater than the thickness of a blocking means in the form of a disc 11 supported for rotation about its axis by a support means in the form of a pin 12 extending centrally through the disc 11 and fixedly carried by the housing 10. It will be noted that the turning axis of the disc 11 is normal to the turning axis of the switch means 1. The disc 11 is formed in its outer periphery with a notch 11a whose width is slightly greater than the width of the bifurcated portion 4a of the shaft 4, and in the position of the parts shown in Fig. 2 this bifurcated portion 4a is located within the notch 11a so that the switch means prevents movement of the blocking means 11, the switch means being in its open position at this time so that the motor M is stopped. When the lever E is turned so as to close the switch means the bifurcated portion 4a of the shaft 4 will be turned through 90° so that its bifurcated portions will be located adjacent to the opposite side faces of the disc 11 and the latter is then free to turn through the space between the bifurcations of portion 4a.

An elongated catch pin 13 is fixed to and extends from the bifurcated portion 4a, this catch pin making an angle of approximately 45° with the axis of turning of the blocking disc 11 when this axis is projected onto a plane normal to the turning axis of the shaft 4 and in which the pin 13 is located, with the parts in the position shown in Fig. 2. A spring 19 is compressed between a wall of the housing 10, on the one hand, and the pin 13, on the other hand, and urges the pin to the position thereof shown in Fig. 3 where the switch means is open. Of course, if desired, a tension spring could be connected to the housing 10 and the lever 13 to urge the latter in a clockwise direction opposite to the arrow X of Fig. 3. A pawl 14 is pivotally supported by a pin 15 carried by the housing 10, and the tooth of the pawl 14 is located at the elevation of the pin 13 so that when the latter is turned through approximately 90° in a counterclockwise direction from the position of Fig. 3 during closing of the switch means 1, the pawl 14 rides over the pin 13 and catches the latter to prevent return of the switch means to its open position under the influence of the spring 19, elements 13 and 14 thus forming a means for releasably holding the switch means in its closed position. A manually engageable lever A is located at the exterior of the housing 10 and is fixed to a rod 18 supported for rotation about its axis by the housing 10 and having fixed thereto in the interior of the housing a lever 17 pivotally connected at one of its ends to an end of a link 16 whose opposite end is pivotally connected to the pawl 14. Thus, the lever A may be turned to raise the pawl 14 from the pin 13 to release the switch means to the action of the spring 19 which returns the switch means to its open position.

The blocking means 11 is formed at its periphery with another notch 11b angularly displaced from the notch 11a, and a manually operable setting means which sets the position of the valve means U cooperates with the notch 11b. This valve setting means includes a lever R fixed at the exterior of the housing 10 to a shaft 21 which is supported for rotation about its axis by the housing 10 and which is prevented from axial shifting movement by the housing 10. The shaft 21 has fixed thereto in the interior of the housing 10 a sector-shaped plate 20 whose axis coincides with that of the shaft 21, and an arcuate plate 20a extends to the right from and is fixed to the outer periphery of the plate 20, as viewed in Fig. 2. The arcuate plate 20a extends into the notch 11b, and when the handle R is turned the plate 20a moves through the notch 11b, the latter being large enough to provide sufficient clearance for free turning movement of the plate 20a. This plate 20a is formed with a pair of angularly spaced notches 20b and 20c spaced from each other about the axis of shaft 21 and extending inwardly from the right free edge of the plate 20a, as viewed in Fig. 3, these notches being shown as they appear in an end view in Fig. 5. Each of the notches 20b and 20c has a width slightly greater than the thickness of the disc 11, so that when the handle R is turned so as to locate either of these notches in alignment with disc 11 the latter can turn freely. The plate 20a has a portion 20d located between the notches 20b and 20c, and when this portion 20d is located in notch 11b the disc 11 cannot turn. Also, to the right of the notch 20c, as viewed in Fig. 5, the plate 20a has a portion 20e which prevents turning of the disc 11 when this portion 20e is located in the notch 11b.

A lever 22 is fixed to the shaft 21 for turning movement therewith and is pivotally connected to one end of a rod 23 which forms part of a linkage connected operatively with the valve U for placing the latter in preselected position corresponding to the angular position of the shaft 21. When this shaft 21 is located by the operator in a position placing the notch 20b in alignment with the disc 11 so that the latter is free to turn, the valve U is in a position where the pressure liquid is moved through the hydraulic drive H in a direction causing the vehicle to move forwardly. Thus, this angular position of the shaft 21 and handle R correspond to the forward moving position of the vehicle. When the handle R is turned so as to locate the notch 20c in alignment with the disc 11, the latter is also free to turn, but at this time the valve U is set so as to direct the pressure liquid in a reverse direction through the hydraulic drive H and thus the vehicle will be moved rearwardly, this position of the lever R corresponding to the reverse drive position. At all other positions of the handle R and plate 20a, the disc 11 is prevented from moving. When the portion 20d of the plate 20a is located in the notch 11b so as to prevent turning of the disc 11, the valve U is in a fully closed position, and thus this position of the handle R corresponding to the "hold" position. When the handle R is turned so as to locate the portion 20e of the plate 20a in the notch 11b, the disc 11 cannot turn and at this time the valve U is placed in a position which interconnects the supply and return flow lines of the hydraulic medium, so that in this position the hydraulic medium can circulate freely and the vehicle is capable of rolling without being driven by the motor, as, for example, when the vehicle is on an incline and it is desired to permit the vehicle to roll down the same. The housing 10 carries behind the lever R a scale 24 to indicate the four positions of the lever R described above.

A manually operable adjusting means G cooperates with the pump through a suitable discharge valve for controlling the rate of delivery of pressure liquid from the pump to the hydraulic drive, so that this adjusting means controls the speed of the vehicle, and the blocking means 11 cooperates with this adjusting means so as to prevent operation of the latter except when the switch means is in its closed position. Thus, the disc 11 has a toothed arcuate member 25 fixed thereto, and the teeth of the member 25 mesh with a pinion 26 fixed to a shaft 27 supported for rotation by the housing 10 and prevented thereby from axial shifting movement, this shaft 27 fixedly carrying at the exterior of the housing 10 the hand wheel G which is turned by the operator for controlling the speed of movement of the vehicle. A lever 28 is fixed to the shaft 27 for turning movement therewith and is pivotally connected to one end of a rod 29 of a linkage which cooperates with a discharge valve or the like of the pump P for controlling the delivery of pressure liquid to the drive H.

A spring 30 is connected at its left end, as viewed in Figs. 2 and 3 to the disc 11 and at its right end to the housing 10 so as to urge the disc 11 in the direction of arrow Y of Fig. 2 to a position which automatically locates the adjusting means G in a neutral position where little or no liquid is delivered from the pump P to the drive H. Thus, whenever the operator releases the hand wheel G the adjusting means will automatically be returned to its neutral position and the vehicle will slow down and stop.

An additional stop structure is provided between the levers E and R. This structure takes the form of an elongated stop pin 32 (Fig. 2) supported by the housing 10 for vertical shifting movement. A spring 31 is coiled about the pin 32, engages with its bottom end against the housing 10, and engages with its top end against a collar 36 fixed to the pin 32 so as to urge the latter upwardly toward element 20, 20a. This latter element is formed with a bore 33 adapted to receive the top end of the stop pin 32 when the lever R is in the "hold" position. In other words, when the portion 20d of plate 20a is in the notch 11b, the bore 33 will be positioned directly over the pin 32 so that the spring 31 can raise the pin 32 into the bore 33 to releasably lock the valve setting means in the "hold" position. The pin 32 terminates at its bottom end adjacent the lever E, and when the pin 32 is moved downwardly so as to release the valve setting means the bottom end of the pin 32 is located alongside of the lever E and cooperates with a projection 7b thereof to prevent removal of the lever E even if it is properly aligned with the cutout 9a of the ring 9. Moreover, the bottom end of pin 32 when it is out of bore 33 cooperates with the lever E to prevent turning thereof in an improper direction and to locate the switch means in its open position.

An arm 34 is fixed to the bifurcated portion 4a of the shaft 4 for turning movement with the latter, and this arm 34 fixedly carries a cam 35 having a bottom camming edge which cooperates with the collar 36 at the upper face thereof, as viewed in Fig. 2, to lower the collar 36 together with the pin 32 during turning of the shaft 4 when the switch means is moved from its open to its closed position. The cam 35 forms part of a cylinder whose axis coincides with that of the shaft 4.

The above described structure operates as follows:

The operator introduces the key E into the ring 9 through a suitable opening in the housing 10, the pin 32 being in its upper position extending into the bore 33 to prevent turning of the handle R at this time. With the lever E in its operating position, the operator turns this lever so as to close the switch means and start the motor. This turning causes the cam 35 to cooperate with collar 36 so as to lower the pin 32 in order to release the valve setting means, and it will be noted that even if the lever E should be turned to locate the switch in its open position the lever E cannot be removed until the valve setting means is moved to permit the bore 33 to be aligned with the rod 32. In addition, the turning of the lever E to start the motor turns the shaft 4 so as to place its bifurcated end portion 4a in a position freeing the blocking disc 11, and when the switch is closed the hand wheel G can be turned. The pawl 14 cooperates with pin 13 to hold the switch in its closed position. Of course, the disc 11 still cannot turn until the handle R is turned to the forward or rearward drive position. It will be noted that once the disc 11 is turned so as to become located in one of the notches 20b or 20c the disc 11 prevents turning of the lever R, so that in order to change the valve setting it is necessary for the operator to return the hand wheel G to its neutral position or to release the hand wheel so that the spring 30 returns it to its neutral position, and then the notch 11b will be positioned to permit movement of the valve setting means. In the same way, when the disc 11 is turned beyond the position of Fig. 2 and located in the space between the bifurcations of portion 4a of lever 4, the disc 11 acts as an additional means preventing return of the switch to its open position until the hand wheel G is located in a neutral position. Even when the hand wheel G is in its neutral position, the switch will not open until the operator actuates the lever A to move the pawl 14 away from the pin 13, and then the spring 19 automatically opens the switch. This movement of the switch also releases the pin 32 to the force of spring 31 which will shift the pin 32 into the opening 33 when the lever R is located in the "hold" position, thus permitting the handle E to be removed.

A rod 37 is pivotally connected to the lever 17 and is operatively connected with a time-responsive automatic release device. When this automatic release operates after a preset period of time, the rod 37 turns the lever 17 so as to move the pawl 14 away from the pin 13 and the switch is automatically opened.

The above described example has been chosen to explain the invention particularly because this embodiment permits almost the entire functioning of the structure of the invention to be illustrated in one figure, namely Fig. 2. To obtain certain advantages in the construction and in the manufacture thereof many elements and means of transmission of power will be constructed differently. In particular, the construction will be carried out so that all of the manually operable elements are located adjacent each other. Of course, some or all of these elements can be indirectly actuated either electrically or hydraulically.

It will be understood that each of the elements described above, or two or more together, may also find a useful application in other types of vehicles differing from the types described above.

While the invention has been illustrated and described as embodied in vehicle controls, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a control arrangement, in combination, a driving motor; a switch cooperating with said driving motor and having a closed position for starting said motor and an open position for stopping said motor; pump means operatively connected to and driven by said motor when the latter operates; manually operable adjusting means operatively connected to said pump means for controlling the rate of delivery of liquid therefrom; and means cooperating with said adjusting means and said switch for preventing operation of said adjusting means when said switch is not in its closed position.

2. In a control arrangement, in combination, a driving motor; a switch cooperating with said driving motor and having a closed position for starting said motor and an open position for stopping said motor; pump means operatively connected to and driven by said motor when the latter operates; manually operative adjusting means operatively connected to said pump means for controlling the rate of delivery of liquid therefrom; movable blocking means cooperating with said adjusting means and switch for preventing operation of said adjusting means except when said switch is in said closed position thereof; valve means located between said pump means and a conduit means and communicating therewith, said valve means having one position where liquid flows in one direction through said conduit means and another position where liquid flows in an opposite direction through said conduit means from said pump means; and manually operable setting means cooperating with said valve means for selectively setting the same in either of its positions, said setting means cooperating with said blocking means for preventing movement thereof except when said setting means locates said valve means in one of its positions.

3. In a control arrangement, in combination, a driving motor; a switch cooperating with said driving motor and having a closed position for starting said motor and an open position for stopping said motor; pump means operatively connected to and driven by said motor when the latter operates; manually operative adjusting means operatively connected to said pump means for controlling the rate of delivery of liquid therefrom; movable blocking means cooperating with said adjusting means and switch for preventing operation of said adjusting means except when said switch is in said closed position thereof; valve means located between said pump and conduit means and communicating therewith, said valve means having one position where liquid flows in one direction through said conduit means and another position where liquid flows in an opposite direction through said conduit means from said pump means; manually operable setting means cooperating with said valve means for selectively setting the same in either of its positions, said setting means cooperating with said blocking means for preventing movement thereof except when said setting means locates said valve means in one of its positions; second blocking means cooperating with said setting means for preventing the operation thereof when said switch is in its open position, said second blocking means being movable to a release position releasing said setting means for operation; and means cooperating with said switch and second blocking means for moving the latter to its release position when said switch is placed in its closed position.

4. In a control arrangement, in combination, a driving motor; pump means connected to said motor to be driven thereby; manually operable adjusting means cooperating with said pump means for controlling the delivery of liquid therefrom, said adjusting means having a neutral position where the delivery of liquid from said pump is at a minimum; switch means cooperating with said motor and having a closed position for starting said motor and an open position for stopping said motor; and movable blocking means cooperating with said switch means and adjusting means for preventing movement of said adjusting means from its neutral position except when said switch means is in its closed position, said blocking means also preventing movement of said switch means from its closed to its open position except when said adjusting means is in its neutral position.

5. In a control arrangement, in combination, a driving motor; pump means connected to said motor to be driven thereby; valve means located between said pump means and conduit means and communicating therewith, said valve means having one position where liquid flows in one direction through said conduit means and another position where liquid flows in an opposite direction through said conduit means from said pump means; manually operable adjusting means cooperating with said pump means for controlling the rate of delivery of liquid therefrom; support means; a blocking disc supported for turning movement about its axis by said support means and having a pair of stop portions angularly displaced about its turning axis; means connecting said disc with said adjusting means for preventing operation of the latter except when said disc is free to turn; switch means cooperating with said motor and having a closed position for starting said motor and an open position for stopping said motor, said switch means cooperating with one of said stop portions of said disc for preventing turning of the latter except when said switch means is in its closed position; and manually operable lever means turnably carried by said support means and cooperating with said valve means, said lever means having one position setting said valve means to move liquid in said one direction and another position setting said valve means to move liquid in said opposite direction, and said lever means cooperating with the other of said stop portions of said disc for preventing turning of the latter except when said lever means is in one of said positions thereof.

6. In a control arrangement, in combination, a driving motor; a switch cooperating with said driving motor and having a closed position for starting said motor and an open position for stopping said motor; pump means operatively connected to and driven by said motor when the latter operates; manually operable adjusting means operatively connected to said pump means for controlling the rate of delivery of liquid therefrom; means cooperating with said adjusting means and said switch for preventing operation of said adjusting means when said switch is not in its closed position; and releasable holding means cooperating with said switch for releasably holding the same in said closed position thereof.

7. In a control arrangement, in combination, a driving motor; a switch cooperating with said driving motor and having a closed position for starting said motor and an open position for stopping said motor; pump means operatively connected to and driven by said motor when the latter operates; manually operable adjusting means operatively connected to said pump means for controlling the rate of delivery of liquid therefrom; means cooperating with said adjusting means and said switch for preventing operation of said adjusting means when said switch is not in its closed position; releasable holding means cooperating with said switch for releasably holding the same in said closed position thereof; and manually operable means cooperating with said holding means for moving the same to a release position releasing said switch for movement from its closed to its open position.

8. In a control arrangement, in combination, a driving motor; a switch cooperating with said driving motor and having a closed position for starting said motor and an open position for stopping said motor; pump means operatively connected to and driven by said motor when the latter operates; manually operable adjusting means operatively connected to said pump means for controlling the rate of delivery of liquid therefrom; means cooperating with said adjusting means and said switch for preventing operation of said adjusting means when said switch is not in its closed position; releasable holding means cooperating with said switch for releasably holding the same in said closed position thereof; and spring means cooperating with said switch for urging the same from its closed to its open position.

9. In a control arrangement, in combination, a driving motor; pump means driven by said motor; manually operable adjusting means cooperating with said pump means for adjusting the rate of delivery of liquid therefrom; movable blocking means cooperating with said adjusting means for preventing operation thereof except when said movable blocking means is free to move, said movable blocking means having a predetermined position where it is capable of being blocked against movement; and switch means cooperating with said motor and having a closed position for starting said motor and an open position for stopping said motor, said switch means cooperating with said blocking means for preventing movement thereof only when said blocking means is in said position where it is capable of being blocked, said adjusting means moving said blocking means from said position thereof when said adjusting means is operated.

10. In a control arrangement, in combination, pump means; valve means connected to said pump means and operable between a plurality of positions for directing the delivery of liquid from the pump; manually operable adjusting means cooperating with said pump means for adjusting the rate of delivery of liquid therefrom; moveable blocking means cooperating with said adjusting means for preventing operation thereof except when said blocking means is free to move; and manually operable setting means cooperating with said valve means for setting the same selectively in its plurality of positions, said manually operable setting means respectively having setting positions corresponding respectively to the positions of said valve means and said setting means cooperating with said blocking means for preventing movement thereof in at least one of said setting positions and for freeing said blocking means for movement in other setting positions of said setting means.

11. In a control arrangement the combination as recited in claim 10, with said blocking means being in the form of a disc supported for turning movement about its axis and formed in its outer periphery with a notch, and said setting means including a plate shiftable through said notch and formed with at least one cutout at least as wide as the thickness of said disc, said setting means in one of its positions locating said cutout of said plate in alignment with said disc so that the latter is free to turn through said cutout and said setting means in other setting positions thereof locating portions of said plate respectively adjacent said cutout in said notch of said disc to prevent turning thereon.

12. In a control arrangement the combination as recited in claim 10, with said setting means and valve means each having four positions, namely, a first position where the liquid from the pump is directed out of the valve through an outlet port, a second position where the liquid from the pump is directed out of the valve through a second outlet port, a third position where no liquid flows from said valve, and a fourth position where the liquid circulates through said valve and is returned to said pump without flowing out of either of said outlet ports, said setting means freeing said blocking means for movement in said first and second positions and preventing said blocking means from movement in said third and fourth positions.

13. In a control arrangement, in combination, a motor; pump means driven by said motor; valve means connected to said pump means and operable between a plurality of positions for directing the delivery of liquid from the pump; switch means cooperating with said motor and having a closed position for starting the motor and an open position for stopping the motor; manually operable adjusting means operatively connected to the pump for controlling the delivery of liquid therefrom; blocking means cooperating with said switch means and adjusting means for preventing operation of the latter except when said switch means is in its closed position; a handle removably connected to said switch means for manual operation thereof; manually operable setting means cooperating with said valve means for setting the same in a selected position; and stop means extending between said setting means and handle, having one position engaging said setting means for preventing operation thereof and freeing said handle for removal from said switch means and having another position freeing said setting means for operation and preventing removal of said handle from said switch means.

14. In a control arrangement, in combination, a motor; a pump driven by said motor; valve means; switch means cooperating with said motor and having a closed position for starting the motor and an open position for stopping the motor; manually operable adjusting means operatively connected to the pump for controlling the delivery of liquid therefrom; blocking means cooperating with said switch means and adjusting means for preventing operation of the latter except when said switch means is in its closed position; a handle removably connected to said switch means for manual operation thereof; manually operable setting means cooperating with said valve means for setting the same in a selected position; stop means extending between said setting means and handle, having one position engaging said setting means for preventing operation thereof and freeing said handle for removal from said switch means and having another position freeing said setting means for operation and preventing removal of said handle from said switch means; spring means cooperating with said stop means and urging the same to said position where it prevents operation of said setting means; and moving means connected to said switch means for movement therewith and cooperating with said stop means for moving the latter from said one to said other position thereof when said switch means is moved from its open to its closed position.

15. In a control arrangement, in combination, a motor; pump means driven by said motor; manually operable adjusting means cooperating with said pump means for controlling the rate of delivery of liquid therefrom; switch means cooperating with said motor and having a closed position for starting the motor and an open position for stopping the motor; blocking means cooperating with said adjusting means and switch means for preventing operation of said adjusting means except when said switch means is in its closed position; a handle removably connected to said switch means and operable for moving the same between its open and closed positions; and a casing formed with a cutout through which said handle extends into its cooperative position with said switch means and through which said handle can be removed only when said switch means is in its open position.

16. In a control arrangement for a drive mechanism, in combination, support means; master control switch means supported for turning movement about a predetermined axis by said support means between closed and open positions, said switch means having a free bifurcated end portion turnable about said axis and having a space of predetermined width between its bifurcations; a blocking disc carried by said support means for turning movement about an axis perpendicular to the turning axis of said switch means, said disc being formed with a cutout in which said bifurcated end portion of said switch means is located when said switch means is in its open position, said disc having a thickness less than the width of said space between said bifurcations and the turning axis of said switch means being located in the plane of said disc, said switch means when it is in its closed position locating said bifurcations respectively adjacent the opposite side faces of said disc in a position where said disc is free to turn through said space between said bifurcations; and control means carried by said support means for controlling said drive mechanism, said control means being in driving engagement with said disc so as to be blocked when said disc is prevented from turning by the location of said bifurcated end portion of said switch means in said cutout of said disc.

17. In a control arrangement for use with a drive mechanism of a vehicle, in combination, support means; master control switch means supported for turning movement about a predetermined axis by said support means between closed and open positions, said switch means having a free bifurcated end portion turnable about said axis and having a space of predetermined width between its bifurcations; a blocking disc carried by said support means for turning movement about an axis perpendicular to the turning axis of said switch means, said disc being formed with a cutout in which said bifurcated end portion of said switch means is located when said switch means is in its open position, said disc having a thickness less than the width of said space between said bifurcations and the turning axis of said switch means being located in the plane of said disc, said switch means when it is in its closed position locating said bifurcations respectively adjacent the opposite side faces of said disc in a position where said disc is free to turn through said space between said bifurcations; control means carried by said support means for controlling said drive mechanism, said control means being in driving engagement with said disc so as to be blocked when said disc is prevented from turning by the location of said bifurcated end portion of said switch means in said cutout of said disc; a pin fixed to and extending from said switch means for turning movement therewith; a pawl carried by said support means and engaging said pin when said switch means is in its closed position for preventing temporarily the return of said switch means to its open position; and manually operable means cooperating with said pawl for moving the same out of engagement with said pin to release said switch means for return to its open position.

18. The structure according to claim 16, wherein said disc is formed with a second cutout, wherein pump means are provided, wherein is provided a valve means operable between a plurality of positions for respectively directing the delivery of liquid from the pump, and wherein a manually operable setting means cooperates with said valve means for setting the same and includes a plate movable through said second cutout during operation of said setting means, said plate having at least one portion located in said second cutout to prevent turning of said disc in at least one position of said setting means and said plate being located out of said second cutout in another position of said setting means to free said disc for turning movement.

References Cited in the file of this patent

UNITED STATES PATENTS

| | | |
|---|---|---|
| 1,288,274 | Sundh | Dec. 17, 1918 |
| 2,368,789 | Tucker | Feb. 6, 1945 |
| 2,547,578 | Holmes | Apr. 3, 1951 |
| 2,690,712 | Foote | Oct. 5, 1954 |
| 2,777,907 | Hooker | Jan. 15, 1957 |
| 2,786,104 | Kirchel | Mar. 19, 1957 |

FOREIGN PATENTS

| | | |
|---|---|---|
| 481,311 | Great Britain | Mar. 9, 1938 |